United States Patent

Stengel et al.

[11] Patent Number: 5,823,053
[45] Date of Patent: Oct. 20, 1998

[54] GEAR-SHIFT DEVICE FOR A CHANGE-SPEED GEARBOX

[75] Inventors: Martin Stengel, Urbach; Günter Wörner, Kernen, both of Germany

[73] Assignee: Daimler-Benz Aktiengesellschaft, Stuttgart, Germany

[21] Appl. No.: 923,554

[22] Filed: Sep. 4, 1997

[30] Foreign Application Priority Data

Sep. 4, 1996 [DE] Germany ................. 196 35 866.3

[51] Int. Cl.$^6$ ................................ F16H 59/04
[52] U.S. Cl. ............... 74/335; 74/473.11; 74/473.12; 74/89.15
[58] Field of Search .................. 74/335, 337.5, 74/480 R, 483 R, 473.11, 473.12, 473.21, 473.23, 473.24, 473.25

[56] References Cited

U.S. PATENT DOCUMENTS

| | | | |
|---|---|---|---|
| 5,357,821 | 10/1994 | Haka et al. | 74/337.5 X |
| 5,507,196 | 4/1996 | Bailly et al. | 74/335 |
| 5,689,997 | 11/1997 | Schaller | 74/335 |
| 5,704,252 | 1/1998 | Loeffler | 74/483 R X |
| 5,743,143 | 4/1998 | Carpenter et al. | 74/335 |

FOREIGN PATENT DOCUMENTS

| | | |
|---|---|---|
| 4137142A1 | 5/1993 | Germany. |
| 4309027A1 | 9/1994 | Germany. |

*Primary Examiner*—Rodney H. Bonck
*Assistant Examiner*—Scott Lund
*Attorney, Agent, or Firm*—Evenson McKeown Edwards & Leonard, PLLC

[57] ABSTRACT

In a gear-shift device for a change-speed gearbox, a shift actuator, a selection actuator, an actuator which is arranged such that it can be displaced exclusively axially with regard to a housing, an auxiliary transmission for converting a rotary motion into a reciprocating motion, a brake which is connected to the selection actuator and an engageable and disengageable locking device are arranged in terms of their action in such a manner that two of the three actuators are arranged fixed in terms of movement with respect to one another and are connected to the third actuator by the auxiliary transmission, and the selection actuator is fixed either in a rotationally fixed or axially undisplaceable manner with regard to the housing.

25 Claims, 3 Drawing Sheets

GEAR-SHIFT DEVICE FOR A CHANGE-SPEED GEARBOX

BACKGROUND AND SUMMARY OF THE INVENTION

This application claims the priority of German application 196 35 866.3-14 filed in Germany on Sep. 4, 1996, the disclosure of which is expressly incorporated by reference herein.

The invention relates to a gear-shift device for a change-speed gearbox of the type having multiple actuators A gear-shift device of the general type mentioned at the outset forms the subject-matter of pending U.S. application Ser. No. 08/818,358 filed Mar. 17, 1997 (based on corresponding German Patent Application 196 10 104.2-14), which is not a prior publication.

In this gear-shift device, a selection control sleeve is arranged concentrically to a shift control shaft and is connected to the latter by the auxiliary transmission in the form of a gate/gate pin arrangement, the shift control shaft being connected, by a rod-like actuator, to a pressure-medium servomotor of the axial-piston design, while an electromagnet is used for actuating the brake acting on the selection control sleeve. The selection control sleeve is fixed immovably with regard to the housing in the longitudinal directions of the central axis, while the shift control shaft is latched by a latching device in its significant rotation-angle positions assigned to a respective shift gate for shifting one or two gears. In this gear-shift device according to the older patent application, it is already possible to shift gear from a current gear into a new gear while skipping at least one intermediate gear by causing the shift control shaft to execute a linear actuation motion which oscillates about the middle significant position and thus alternately engaging and disengaging the brake of the actuation control sleeve when passing through the middle significant position. In order, when skipping gears, to avoid an impact between the synchronization devices assigned to these gears by means of the shift control shaft, a certain free travel is provided for the shift control shaft.

German Patent Document DE 41 37 142 A1 has disclosed a gear-shift device of another type, in which an electric motor is connected, by means of a helical gear mechanism for converting a rotary motion into a reciprocating motion, to a gear-shift rod which is mounted rotatably and axially displaceably in a housing and can be fixed with regard to the housing by means of an engageable and disengageable brake device in such a manner that the gear-shift rod is arranged to be exclusively axially displaceable in the engaged position of the brake, but in the disengaged position of the brake is arranged to be both axially displaceable and rotatable with regard to the housing. The gear-shift rod is directly connected to the motor shaft of the electric motor by means of a coupling which can be engaged and disengaged in opposite directions to the brake. When changing between selecting and shifting, both coupling and brake have to be reversed and the electric motor stopped.

German Patent Document DE 43 09 027 A1 has disclosed a further gear-shift device of another type, in which a gear-shift shaft, which is arranged rotatably and axially displaceably with regard to a pressure-medium cylinder, can be moved by a first axial piston of the pressure-medium cylinder directly in the directions of the gear-shift shaft axis for shifting the gears.

A second axial piston of the pressure-medium cylinder, with the aid of an auxiliary transmission for converting a reciprocating motion into a rotary motion with regard to the gear-shift shaft axis, causes the gear-shift shaft to perform rotary movements for selecting the shift gates.

An object of the invention is to allow a gear-shift device of the type mentioned at the outset likewise to skip at least one intermediate gear when shifting from a current gear into a new gear, while dispensing with or largely avoiding special free travel for the shift actuator.

The above-mentioned object is advantageously achieved according to the invention by providing a gear shift device for a change-speed gearbox, comprising:

a housing, a shift actuator which is arranged rotatably and axially displaceably with respect to a central axis of the housing, a selection actuator which is coaxial with respect to the central axis and is arranged rotatably relative to the housing, the selection actuator being fixed with regard to the housing in the longitudinal directions of the central axis, an axial actuator which is coaxial with respect to the central axis and is arranged such that it can be displaced exclusively axially relative to the housing, an engageable and disengageable brake for fixing the selection actuator with regard to the housing in the circumferential directions of the central axis, and an auxiliary transmission for converting a reciprocating motion into a rotary motion, wherein two of the three actuators are both arranged such that they are fixed in terms of movement with respect to one another, at least in the longitudinal directions of the central axis, and are connected to the third actuator by the auxiliary transmission, wherein an engageable and disengageable locking device is connected in terms of action both to the selection actuator and to the brake in such a manner that the selection actuator can be fixed with regard to the housing alternately either exclusively in the circumferential directions or exclusively in the longitudinal directions of the central axis, and wherein the selection actuator is connected by the auxiliary transmission to the actuator which is arranged such that it can be displaced exclusively axially with regard to the housing.

According to the invention, the shift actuator, when actuated into the rotation-angle position associated with the new gear, remains fixed immovably by the fixing device in the longitudinal directions of the central axis of the housing, so that special free travel for the shift actuator—in order to avoid impact between synchronization devices during this actuation—are not required, because the linear movement required for selecting the new rotation-angle position is performed only by the third actuator which is arranged such that it can be displaced exclusively axially with regard to the housing.

Other objects, advantages and novel features of the present invention will become apparent from the following detailed description of the invention when considered in conjunction with the accompanying drawings.

DETAILED DESCRIPTION OF THE INVENTION

Figure 1:
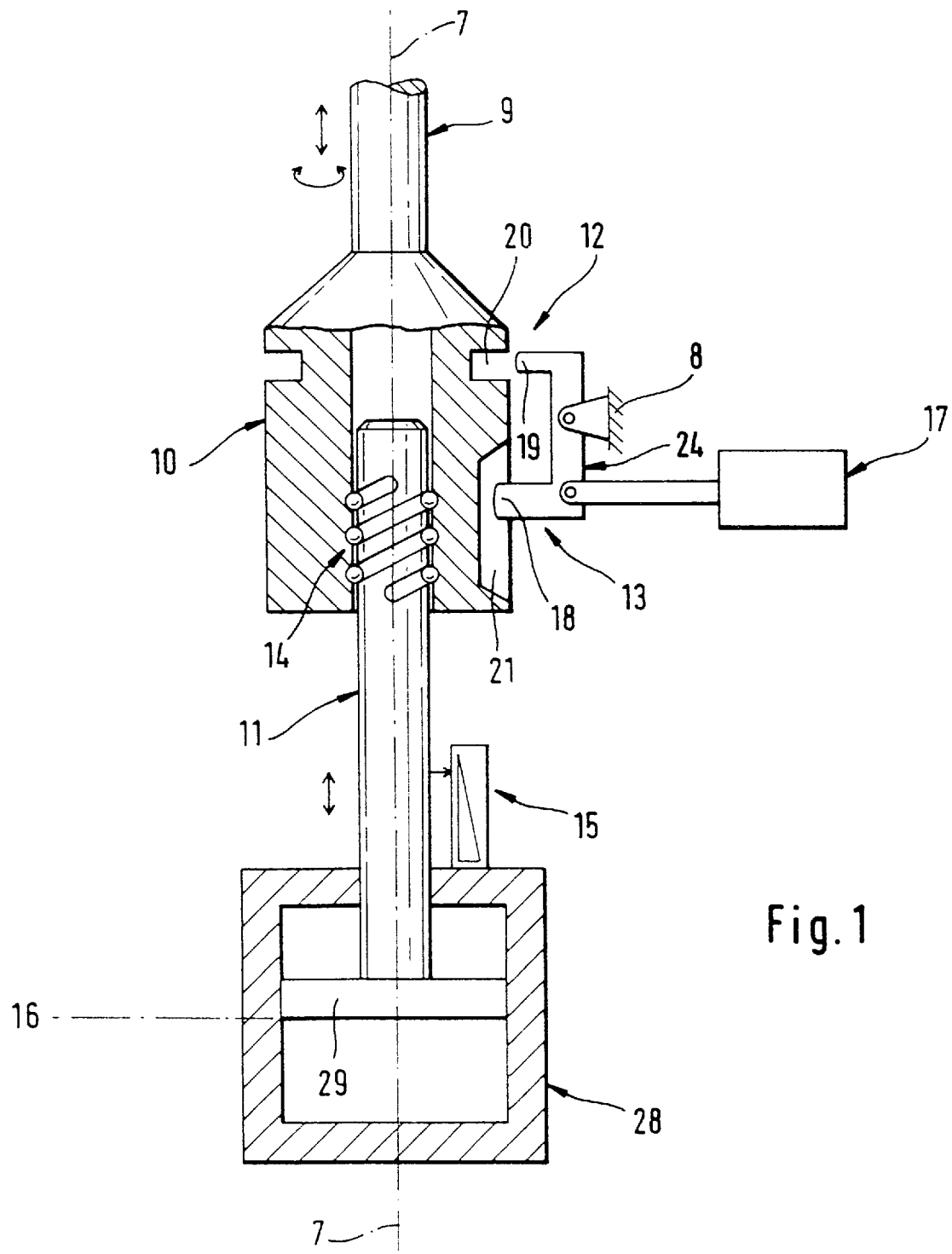
FIG. 1 shows a gear-shift device according to the invention in a first embodiment, illustrated in the form of an axial section containing the central axis.

The following arrangement is common to the three embodiments of FIGS. 1 to 5 of the gear-shift device according to the invention, and includes the following elements arranged coaxially with a central axis 7—7 of a housing 8 (not shown in more detail) of a change-speed gearbox (likewise not shown in more detail).

(i) a shift actuator 9, in the form of a shaft, (ii) a selection actuator 10, in the form of a hollow shaft or sleeve, (iii) a rod-like actuator 11, and (iv) a pressure-medium servomotor 28 with a double-acting axial piston 29.

The shift actuator 9 is designed to be fixed in terms of movement with regard to the selection actuator 10, or is integral therewith. The selection actuator 10 is connected, by means of an auxiliary transmission 14 in the form of a helical gear mechanism for converting a reciprocating motion into a rotary motion, to the actuator 11 which is arranged such that it can be displaced exclusively axially with regard to the housing 8 and is for its part connected fixedly in terms of movement to the axial piston 29.

The shift actuator 9 can be actuated into a significant rotation-angle position (FIG. 3), in which an axial groove 21 on the outer circumference of the selection actuator 10 lies in a reference plane 30—30 of the housing 8, which plane contains the central axis 7—7. The axial groove 21 is assigned to the shift gate 3–4 for optionally engaging forward gears 3 and 4 in such a manner that by actuating the shift actuator 9 in the significant rotation-angle position in the directions of the central axis 7—7 the forward gear 3 or 4 is either engaged or disengaged.

The shift actuator 9 can be actuated into a further significant rotation-angle position (FIG. 3), in which an axial groove 22 on the outer circumference of the selection actuator 10 lies in the reference plane 30—30. The axial groove 22 is assigned to the shift gate 1–2 for optionally shifting the forwards gears 1 and 2 in such a manner that by actuating the shift actuator 9, which is in the significant rotation-angle position, in the directions of the central axis 7—7 the forward gear 1 or 2 is either engaged or disengaged.

The shift actuator 9 can be actuated into a third significant rotation-angle position (FIG. 3), in which an axial groove 23 on the outer circumference of the selection actuator 10 lies in the reference plane 30—30. The axial groove 23 is assigned to the shift gate 5–6 for optionally shifting the forward gears 5 and 6 in such a manner that by actuating the shift actuator 9, which is in the significant rotation-angle position, in the directions of the central axis 7—7 the forward gear 5 or 6 is either engaged or disengaged.

To actuate the shift actuator 9 into the respective significant rotation-angle position, the selection actuator 10 is fixed with regard to the housing 8, in the directions of the central axis 7—7, by means of an engageable and disengageable locking device 12, a locking engagement member 19 being engaged in a circumferential groove 20 on the outer circumference of the selection actuator 10 in such a manner that the selection actuator 10 is fixed so as to be undisplaceable exclusively axially.

To actuate the shift actuator 9 in the directions of the central axis 7—7 for the purpose of shifting the gears, the locking device 12 is disengaged and a brake 13, which is connected to the selection actuator 10, is engaged, a brake engagement member 18 passing into the axial groove 21 or 22 or 23 which is respectively situated in the reference plane 30—30 in a rotationally fixed but axially displaceable manner relative to the selection actuator 10.

Figure 6:
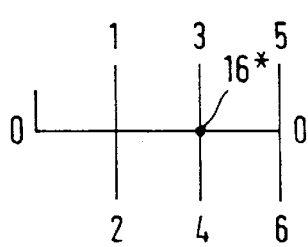
FIG. 6 shows a gear-shift diagram for actuation of the shift actuator in the gear-shift device according to the invention.

The axial piston 29 has a significant stroke position 16, in which the shift actuator 9, in the unactuated position, adopts a rest position 16*, which is centered by return springs, at the transition between the shift gate 3–4 and a neutral selection gate 0—0 of the shift diagram of FIG. 6. In the rest position 16*, the shift actuator 9 is situated in the significant rotation-angle position of the switch gate 3–4, the brake engagement member 18 passing into the associated axial groove 21.

In order to ensure that the locking device 12 and the brake 13 can be actuated only in the significant stroke position 16 of the axial piston 29, a displacement sensor 15, which indicates the stroke position 16, is connected to a device which controls a servomotor 17 of the brake 13 but is not shown in more detail.

In the first embodiment of the gear-shift device according to the invention in accordance with FIG. 1, the circumferential groove 20 of the locking device 12 is offset with regard to the axial grooves 21 to 23 of the brake 13 in the longitudinal directions of the central axis 7—7, the brake engagement member 18 being connected to the locking engagement member 19 by means of a differential lever 24 which is articulated with regard to the housing 8 in its middle region.

Figure 2:
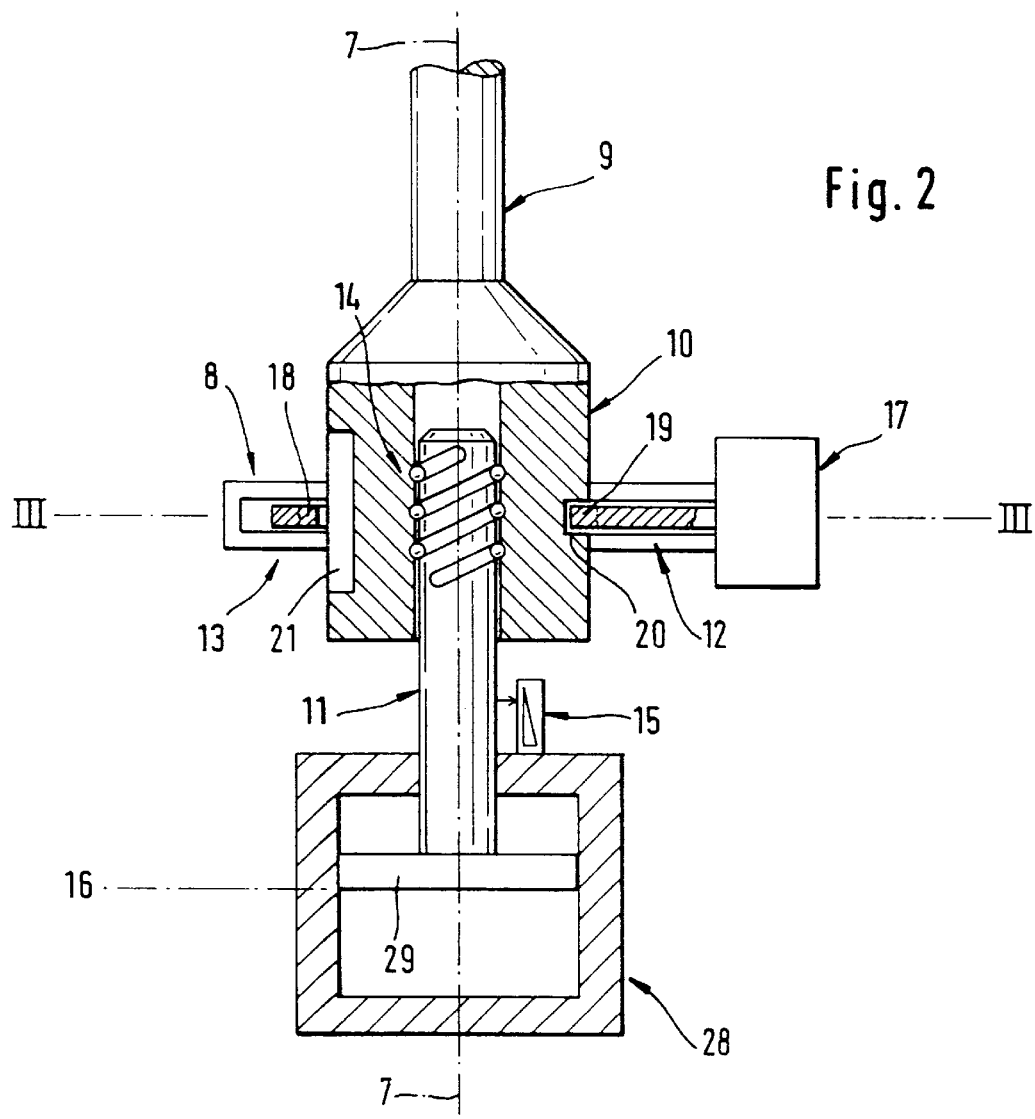
FIG. 2 shows a gear-shift device according to the invention in a second embodiment, illustrated in the form of an axial section containing the central axis.
Figure 3:
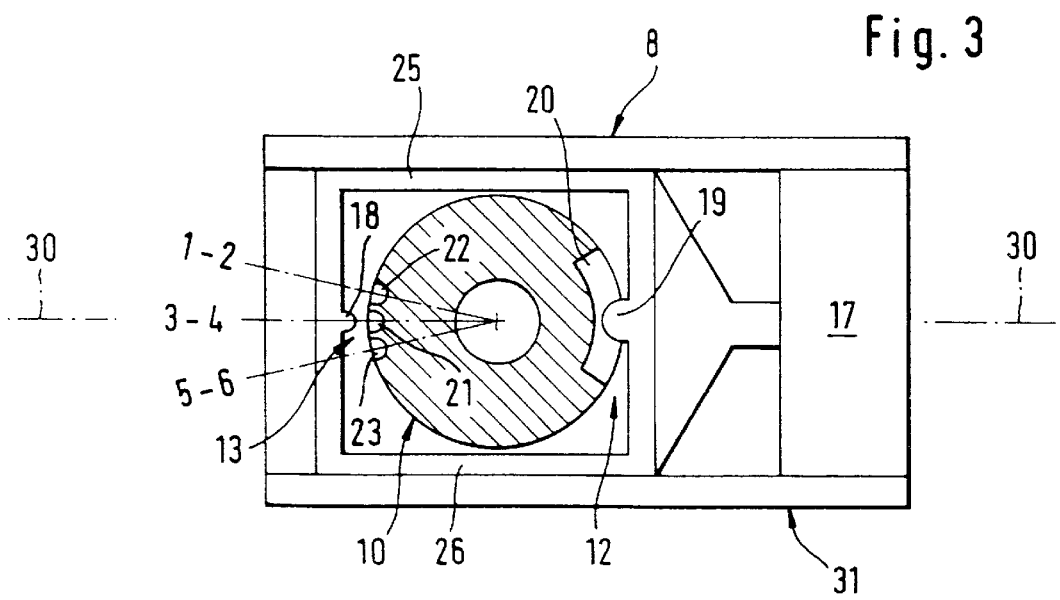
FIG. 3 shows a cross-section of the gear-shift device of FIG. 2 on line III—III.

In the second embodiment of the gear-shift device according to the invention in accordance with FIG. 2 and 3, the circumferential groove 20 of the locking device 12 is arranged diametrically opposite, with regard to the central axis 7—7, to the axial grooves 21 to 23 of the brake 13, the brake engagement member 18 and the locking engagement member 19 being connected to one another by at least one hoop-like linkage 25 and/or 26, which surrounds the selection actuator 10, and the linkages being displaceably guided parallel to the reference plane 30—30 in a frame-like guide 31 which is fixed in terms of movement to the housing 8.

Figure 4:
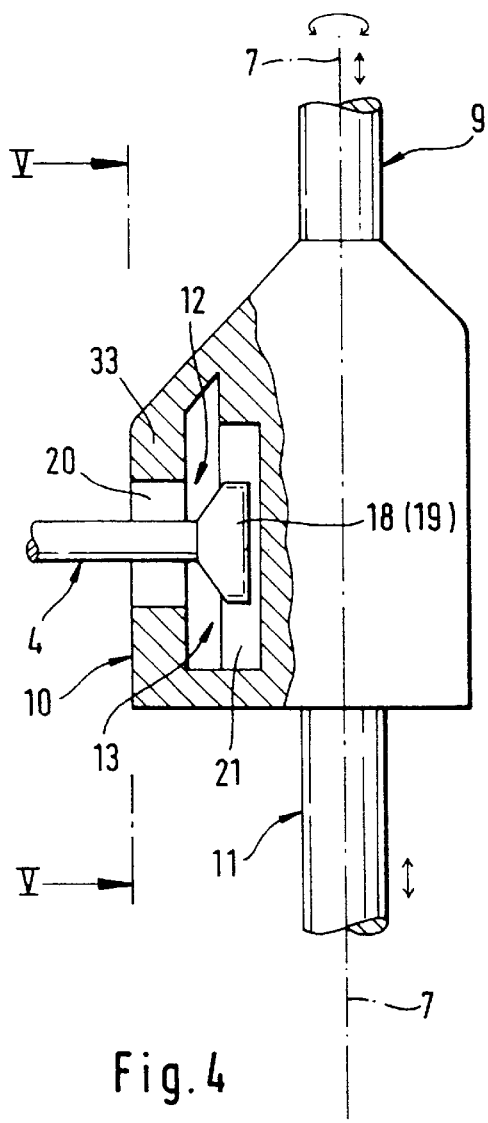
FIG. 4 shows a gear-shift device according to the invention in a third embodiment, illustrated in the form of a partial section containing the central axis.
Figure 5:
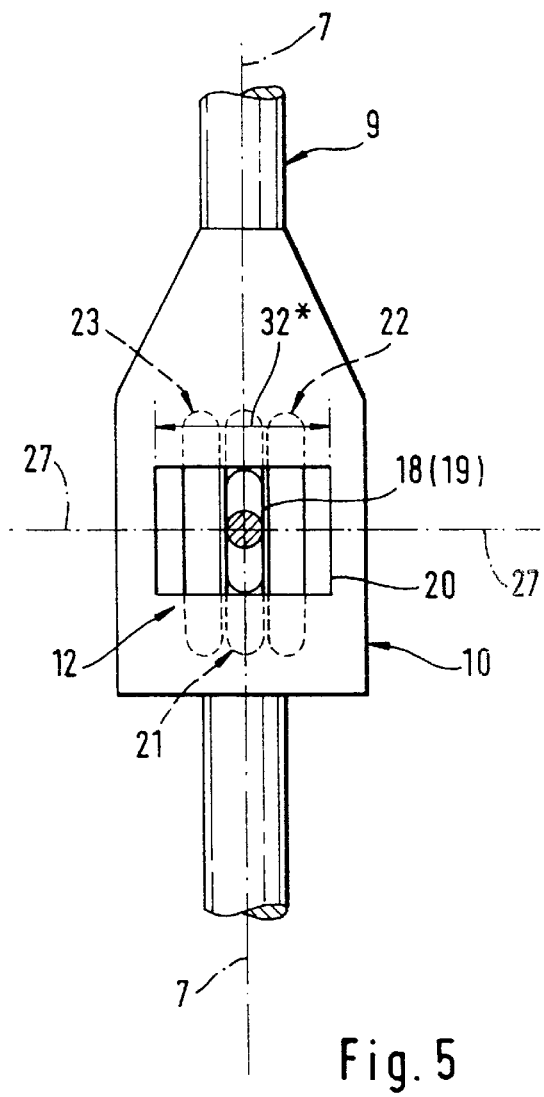
FIG. 5 shows a partial longitudinal section through the gear-shift device of FIG. 4 on line V—V.

In the third embodiment of the gear-shift device according to the invention in accordance with FIGS. 4 and 5, both the circumferential groove 20 of the locking device 12 and the axial grooves 21 to 23 of the brake 13 are arranged centrically with respect to a reference plane 27—27 of the selection actuator 10, which plane lies perpendicular to the central axis 7—7. The axial grooves 21 to 23 lie within the rotation-angle region covered by the circumferential groove 20, the position 32* indicating a chord length corresponding to the dimension of the curve of the rotation-angle range.

The circumferential groove 20 is situated in a radial bulge 33 of the selection actuator 10 and radially outwardly with respect to the axial grooves 21 to 23. The brake engagement member 18 of the brake 13 and the locking engagement member 19 of the locking device 12 are structurally combined to form a common engagement member 18 (19), which can alternately be engaged in the circumferential groove 20, on the one hand, or one of the axial grooves 21 to 23, on the other hand, by means of a linkage 4, which is connected in a manner not illustrated in more detail to the servomotor 17 of the brake 13.

In all three embodiments of the gear-shift device, the linkage-coupling between locking device 12, brake 13 and servomotor 17 is made such that the selection actuator 10 is arranged to be either exclusively axially immovable or exclusively rotationally fixed with regard to the housing 8.

The method of operation of the gear-shift device according to the invention is explained below with reference to a gear-shift sequence.

When shifting up from second gear into third gear, the shift actuator 9 initially adopts that rotation-angle position in which the axial groove 22 assigned to the switch gate 1–2 is situated in the reference plane 30—30 and accommodates the brake engagement member 18. By actuating the servomotor 28 into its significant stroke position 16, second gear is disengaged and the shift actuator 9 is moved into the shift gate 0—0 in the direction of the central axis 7—7.

On reaching the significant stroke position 16, the displacement sensor 15 reverses the servomotor 17 of the brake 13, so that the selection actuator 10 is fixed in the longitudinal directions of the central axis 7—7 with regard to the housing 8 by the locking device 12. A subsequent controlled actuation of the actuator 11 by the servomotor 28 leads to a rotary movement of the shift actuator 9 into that significant rotation-angle position in which the axial groove 21 assigned to the switch gate 3–4 lies in the reference plane 30—30. When the shift actuator 9 reaches this rotation-angle position, the servomotor 17 is reversed again, as a result of which the brake engagement member 18 engages in the axial groove 21 and the locking engagement member 19 disengages from the circumferential groove 20. When the servomotor 17 reaches this position, the shift actuator 9 is actuated further by the servomotor 28, in the directions of the central axis 7—7, beyond the selection gate 0—0 and as a result third gear is engaged.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Gear-shift device for a change-speed gearbox, comprising:

a housing, a shift actuator which is arranged rotatably and axially displaceably with respect to a central axis of the housing, a selection actuator which is coaxial with respect to the central axis and is arranged rotatably relative to the housing, the selection actuator being fixable with regard to the housing in the longitudinal directions of the central axis, an axial actuator which is coaxial with respect to the central axis and is displaceable exclusively axially relative to the housing, an engageable and disengageable brake for fixing the selection actuator with regard to the housing in the circumferential directions of the central axis, and an auxiliary transmission for converting a reciprocating motion into a rotary motion, wherein two of the shift, selection, and axial actuators are both arranged such that they are fixed in terms of movement with respect to one another, at least in the longitudinal directions of the central axis, and are connected to a remaining one of the shift, selection, and axial actuators by the auxiliary transmission, wherein an engageable and disengageable locking device is connected in terms of action both to the selection actuator and to the brake in such a manner that the selection actuator can be fixed with regard to the housing alternately either exclusively in the circumferential directions or exclusively in the longitudinal directions of the central axis, and wherein the selection actuator is connected by the auxiliary transmission to the axial actuator which is displaceable exclusively axially with regard to the housing.

2. Gear-shift device according to claim 1, wherein a helical gear mechanism is used for the auxiliary transmission.

3. Gear-shift device according to claim 2, wherein the axial actuator which is displaceable exclusively axially with regard to the housing is connected to a pressure-medium servomotor of axial-piston design.

4. Gear-shift device according to claim 2, wherein a sensor for a significant middle position of the axial actuator which is displaceable exclusively axially with regard to the housing is used and interacts with a servomotor for actuating the brake in such a manner that the brake can be engaged and disengaged exclusively in the significant position of the axial actuator.

5. Gear-shift device according to claim 4, wherein an electromagnet is used for the servomotor of the brake.

6. Gear-shift device according to claim 4, wherein the selection actuator has a circumferential groove which is concentric to the central axis and in which a locking engagement member of the locking device can be engaged, which locking engagement member is arranged fixed in terms of movement with regard to an engageable and disengageable brake engagement member of the brake.

7. Gear-shift device according to claim 6, wherein an electromagnet is used for the servomotor of the brake.

8. Gear-shift device according to claim 6, wherein the circumferential groove is offset in the longitudinal directions of the central axis with regard to axial grooves of the selection actuator, in which axial grooves the brake engagement member can be engaged, and wherein the brake engagement member and the locking engagement member are connected to one another by means of a differential lever which in a central region is mounted pivotably with regard to the housing.

9. Gear-shift device according to claim 8, wherein an electromagnet is used for the servomotor of the brake.

10. Gear-shift device according to claim 6, wherein the circumferential groove is arranged diametrically opposite, with regard to the central axis to axial grooves of the selection actuator, in which axial grooves the brake engagement member can be engaged, and wherein the brake engagement member and the locking engagement member are connected by at least one hoop linkage which surrounds the selection actuator.

11. Gear-shift device according to claim 10, wherein an electromagnet is used for the servomotor of the brake.

12. Gear-shift device according to claim 6, wherein both the circumferential groove and axial grooves of the selection actuator, in which axial grooves the brake engagement member can be engaged, are arranged concentrically with respect to a line located in a reference plane of the selection actuator, wherein the reference plane lies perpendicular to the central axis, wherein the axial grooves lie within a rotation-angle region covered by the circumferential groove, and wherein the circumferential groove is situated radially outwardly with respect to the axial grooves and a common engagement member is used both for the brake engagement member and for the locking engagement member.

13. Gear-shift device according to claim 12, wherein an electromagnet is used for the servomotor of the brake.

14. Gear-shift device according to claim 1, wherein a sensor for a significant middle position of the axial actuator which is displaceable exclusively axially with regard to the housing is used and interacts with a servomotor for actuating the brake in such a manner that the brake can be engaged and disengaged exclusively in the significant position of the axial actuator.

15. Gear-shift device according to claim 14, wherein the axial actuator which is displaceable exclusively axially with regard to the housing is connected to a pressure-medium servomotor of axial-piston design.

16. Gear-shift device according to claim 14, wherein an electromagnet is used for the servomotor of the brake.

17. Gear-shift device according to claim 1, wherein the axial actuator which is displaceable exclusively axially with regard to the housing is connected to a pressure-medium servomotor of axial-piston design.

18. Gear-shift device according to claim 1, wherein the selection actuator has a circumferential groove which is concentric to the central axis and in which a locking engagement member of the locking device can be engaged, which locking engagement member is arranged fixed in terms of movement with regard to an engageable and disengageable brake engagement member of the brake.

19. Gear-shift device according to claim 18, wherein the circumferential groove is offset in the longitudinal directions of the central axis with regard to axial grooves of the selection actuator, in which axial grooves the brake engagement member can be engaged, and wherein the brake engagement member and the locking engagement member are connected to one another by means of a differential lever which in a central region is mounted pivotably with regard to the housing.

20. Gear-shift device according to claim 19, wherein the axial actuator which is displaceable exclusively axially with regard to the housing is connected to a pressure-medium servomotor of axial-piston design.

21. Gear-shift device according to claim 18, wherein the circumferential groove is arranged diametrically opposite, with regard to the central axis to axial grooves of the selection actuator, in which axial grooves the brake engagement member can be engaged, and wherein the brake engagement member and the locking engagement member are connected by at least one hoop linkage which surrounds the selection actuator.

22. Gear-shift device according to claim 21, wherein the axial actuator which is displaceable exclusively axially with regard to the housing is connected to a pressure-medium servomotor of axial-piston design.

23. Gear-shift device according to claim 18, wherein both the circumferential groove and axial grooves of the selection actuator, in which axial grooves the brake engagement member can be engaged, are arranged concentrically with respect to a line located in a reference plane of the selection actuator, wherein the reference plane lies perpendicular to the central axis, wherein the axial grooves lie within a rotation-angle region covered by the circumferential groove, and wherein the circumferential groove is situated radially outwardly with respect to the axial grooves and a common engagement member is used both for the brake engagement member and for the locking engagement member.

24. Gear-shift device according to claim 23, wherein the axial actuator which is displaceable exclusively axially with regard to the housing is connected to a pressure-medium servomotor of axial-piston design.

25. Gear-shift device according to claim 18, wherein the axial actuator which is displaceable exclusively axially with regard to the housing is connected to a pressure-medium servomotor of axial-piston design.

* * * * *